United States Patent
Park et al.

(10) Patent No.: US 10,330,836 B2
(45) Date of Patent: Jun. 25, 2019

(54) DISPLAY APPARATUS AND BACK LIGHT UNIT INCLUDED THEREIN

(71) Applicant: Samsung Electronics Co., Ltd., Suwon-si (KR)

(72) Inventors: Chun Soon Park, Suwon-si (KR); Young Chol Lee, Hwaseong-si (KR); Tae-Hyeong Kim, Seoul (KR); Seung Hun Chae, Suwon-si (KR); Sung Ho Choi, Suwon-si (KR); Hyung Jin Ha, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 15/372,795

(22) Filed: Dec. 8, 2016

(65) Prior Publication Data

US 2017/0205548 A1     Jul. 20, 2017

(30) Foreign Application Priority Data

Jan. 19, 2016    (KR) .......................... 10-2016-0006299

(51) Int. Cl.
    *G02B 5/20*         (2006.01)
    *G02B 5/22*         (2006.01)
    (Continued)

(52) U.S. Cl.
    CPC ............ *G02B 5/208* (2013.01); *G02B 5/223* (2013.01); *G02B 6/0026* (2013.01); *G02F 1/133606* (2013.01)

(58) Field of Classification Search
    CPC ........ G02B 5/208; G02B 5/26; G02B 5/3041; G02B 5/3075; G02B 6/0025; G02B 6/0051; G02F 1/133509; G02F 1/133512; G02F 1/133514; G02F 1/133602; G02F 1/133603; G02F 1/133607; G02F 1/133611; G02F 1/136209
    See application file for complete search history.

(56) References Cited

U.S. PATENT DOCUMENTS

2004/0263723 A1* 12/2004 Moon ............... G02F 1/133514
                                                349/106
2007/0064446 A1*  3/2007 Sharma ................ G02B 5/0221
                                                362/618

(Continued)

FOREIGN PATENT DOCUMENTS

| KR | 10-2015-0012267 | 3/2015 |
| KR | 10-2015-0078246 | 7/2015 |
| KR | 10-1543260 | 8/2015 |

*Primary Examiner* — Ismael Negron
(74) *Attorney, Agent, or Firm* — Staas & Halsey LLP

(57) ABSTRACT

A display apparatus may include a back light unit including a light source and a selective light absorption sheet configured to absorb light of a predetermined wavelength range among light emitted from the light source and an image forming unit configured to transmit or block light emitted from the back light unit to form an image. The selective light absorption sheet may include a selective light absorption film configured to absorb light of a predetermined wavelength range among light emitted from the light source, at least one light blocking film configured to absorb at least one of UV light and IR light, and at least one barrier film configured to block at least one of oxygen and moisture.

9 Claims, 19 Drawing Sheets

(51) Int. Cl.
  *F21V 8/00*   (2006.01)
  *G02F 1/1335*   (2006.01)

(56) References Cited

U.S. PATENT DOCUMENTS

2009/0194774 A1* 8/2009 Huang .............. G02F 1/133603
                                                             257/88
2014/0078716 A1* 3/2014 Ninan ...................... F21V 9/40
                                                             362/84
2015/0378089 A1* 12/2015 Oba ..................... G02B 6/0068
                                                             349/70

* cited by examiner

DISPLAY APPARATUS AND BACK LIGHT UNIT INCLUDED THEREIN

CROSS-REFERENCE TO RELATED APPLICATIONS

This application claims the benefit of Korean Patent Application No. 10-2016-0006299, filed on Jan. 19, 2016 in the Korean Intellectual Property Office, the disclosure of which is incorporated herein by reference.

BACKGROUND

1. Field

Embodiments of the present disclosure relate to display apparatuses and back light units included in the display apparatuses, and more particularly, to display apparatuses to display wide color images and back light units included in the display apparatuses.

2. Description of the Related Art

Display apparatuses refer to output apparatuses displaying visual information converted from acquired or stored electrical information to users and have been widely used in various application fields such as individual homes or places of business.

The display apparatuses may be monitors connected to personal computers or server computers, portable computer devices, navigation devices, general TVs, Internet Protocol televisions (IPTVs), smart phones, tablet PCs, personal digital assistants (PDAs), portable terminals such as cellular phones, various display apparatuses used to reproduce advertisements or movies, or various types of audio/video systems.

The display apparatuses may display a still image or a moving image to users using various types of display devices. Examples of the display devices include cathode ray tubes (CRTs), Light Emitting Diodes (LEDs), Organic Light Emitting Diodes (OLEDs), Active-Matrix Organic Light Emitting Diode (AMOLED), liquid crystal displays, e-paper, or the like.

SUMMARY

Additional aspects and/or advantages will be set forth in part in the description which follows and, in part, will be apparent from the description, or may be learned by practice of the embodiments.

Therefore, it is an aspect of the present disclosure to provide a display apparatus having enhanced color reproduction and a back light unit included therein.

It is another aspect of the present disclosure to provide a back light unit including a selective light absorption film absorbing yellow light and/or orange light and a display apparatus including the same.

It is another aspect of the present disclosure to provide a back light unit in which deterioration of a selective light absorption film is prevented and a display apparatus including the same.

It is another aspect of the present disclosure to provide a back light unit in which exposure of a selective light absorption film to moisture, oxygen, UV light, and/or IR light is prevented, and a display apparatus including the same.

Additional aspects of the disclosure will be set forth in part in the description which follows and, in part, will be obvious from the description, or may be learned by practice of the disclosure.

In accordance with one aspect of the present disclosure, a display apparatus may include a back light unit including a light source and a selective light absorption sheet configured to absorb light of a predetermined wavelength range among light emitted from the light source and an image forming unit configured to transmit or block light emitted from the back light unit to form an image. The selective light absorption sheet may include a selective light absorption film configured to absorb light of a predetermined wavelength range among light emitted from the light source, at least one light blocking film configured to absorb at least one of UV light and IR light, and at least one barrier film configured to block at least one of oxygen and moisture.

The at least one light blocking film may be attached to a first surface of the selective light absorption film, and the barrier film may be attached to the at least one light blocking film.

The at least one light blocking film may be attached to a first surface of the selective light absorption film, and the barrier film may be attached to a second surface of the selective light absorption film.

The at least one light blocking film may include a first light blocking film and a second light blocking film, and the at least one barrier film may include a first barrier film and a second barrier film.

The first and second light blocking films may be attached to first and second surfaces of the selective light absorption film, respectively, and the first and second barrier films may be attached to the first and second light blocking films, respectively.

The first and second barrier films may be attached to first and second surfaces of the selective light absorption film, respectively, and the first and second light blocking films may be attached to the first and second barrier films, respectively.

The back light unit may include a waveguide plate configured to diffuse light emitted from the light source, the light source may be disposed at a side of the waveguide plate, and the selective light absorption sheet may be disposed between the light source and the waveguide plate.

The back light unit may include a diffuser plate configured to diffuse light emitted from the light source, the light source may be disposed behind the diffuser plate, and the selective light absorption sheet may be disposed in front of the diffuser plate.

The selective light absorption film may include tetra-azaporphyrin (TAP) absorbing light having a wavelength in the range of about 570 nm to about 610 nm.

In accordance with one aspect of the present disclosure, a back light unit may include a light source and a selective light absorption sheet configured to absorb light of a predetermined wavelength range among light emitted from the light source. The selective light absorption sheet may include a selective light absorption film configured to absorb light of a predetermined wavelength range among light emitted from the light source, at least one barrier film configured to block at least one of oxygen and moisture, and at least one light blocking film configured to absorb at least one of UV light and IR light.

The at least one light blocking film may be attached to a first surface of the selective light absorption film, and the barrier film may be attached to the at least one light blocking film.

The at least one light blocking film may be attached to a first surface of the selective light absorption film, and the barrier film may be attached to a second surface of the selective light absorption film.

The at least one light blocking film may include a first light blocking film and a second light blocking film, and the at least one barrier film may include a first barrier film and a second barrier film.

The first and second light blocking films may be attached to first and second surfaces of the selective light absorption film, respectively, and the first and second barrier films may be attached to the first and second light blocking films, respectively.

The first and second barrier films may be attached to first and second surfaces of the selective light absorption film, respectively, and the first and second light blocking films may be attached to the first and second barrier films, respectively.

In accordance with one aspect of the present disclosure, a display apparatus may include a back light unit including a light source and a selective light absorption sheet configured to absorb light of a predetermined wavelength range among light emitted from the light source and an image forming unit configured to transmit or block light emitted from the back light unit to form an image. The selective light absorption sheet may include a selective light absorption film, and at least one barrier film configured to block at least one of oxygen and moisture. The selective light absorption film may include a selective light absorption material configured to absorb light of a predetermined wavelength range among light emitted from the light source and a light blocking material configured to absorb at least one of UV light and IR light.

The light blocking material absorbs UV light, and the selective light absorption sheet may include an IR-cut film configured to absorb IR light.

The light blocking material absorbs IR light, and the selective light absorption sheet may include an UV-cut film configured to absorb UV light.

The back light unit may include a waveguide plate configured to diffuse light emitted from the light source, the light source may be disposed at a side of the waveguide plate, and the selective light absorption sheet may be disposed between the light source and the waveguide plate.

The back light unit further may include a diffuser plate configured to diffuse light emitted from the light source, the light source may be disposed behind the diffuser plate, and the selective light absorption sheet may be disposed in front of the diffuser plate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
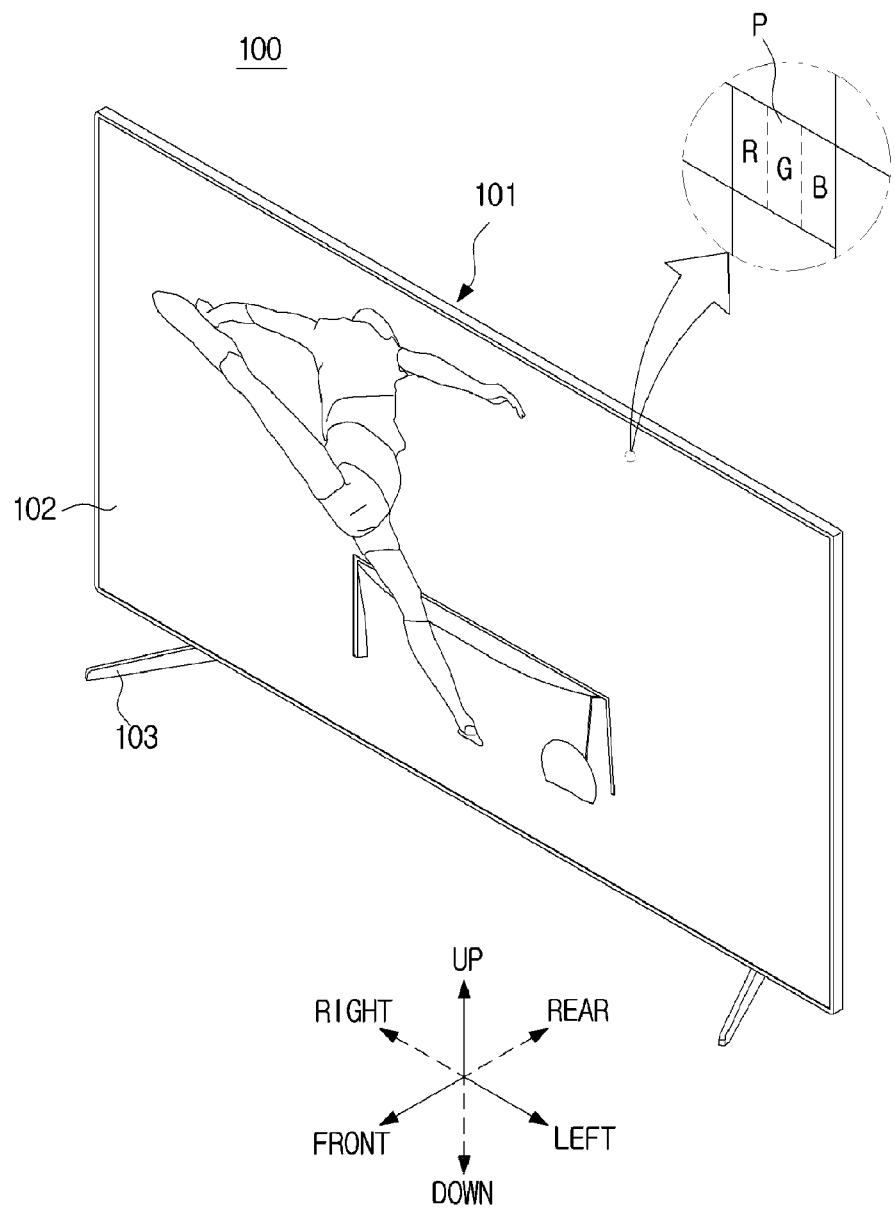
FIG. 1 is a view illustrating an appearance of a display apparatus according to an embodiment.

Reference will now be made in detail to the embodiments, examples of which are illustrated in the accompanying drawings, wherein like reference numerals refer to the like elements throughout. The embodiments are described below by referring to the figures.

Reference will now be made in detail to the embodiments of the present disclosure, examples of which are illustrated in the accompanying drawings, wherein like reference numerals refer to like elements throughout.

Throughout the specification, the terms used are merely used to describe particular embodiments, and are not intended to limit the present disclosure.

As used herein, the singular forms "a", "an" and "the" are intended to include the plural forms as well, unless the context clearly indicates otherwise.

Also, it is to be understood that the terms such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", and the like, may be used herein to distinguish one element from another.

In addition, the terms "unit", "device," "block", "member", and "module" used herein refer to a unit used to process at least one function or operation. For example, these terms may refer to one or more hardware components such as field-programmable gate array (FPGA) or application specific integrated circuit (ASIC), one or more software components stored in a memory, or one or more processors.

Hereinafter, embodiments of the present discloser will be described in detail with reference to the accompanying drawings. In the drawings, like reference numerals will be assigned to like parts or components having substantially same functions.

The terms used through the specification are briefly defined. White light refers to a combination of red, green, and blue light or a combination of blue and yellow light. In addition, natural light refers to a combination of all wavelengths of visible light.

FIG. 1 is a view illustrating an appearance of a display apparatus according to an embodiment.

A display apparatus 100 is an apparatus that processes an image signal received from an external device and visually displays a processed image. Although a television (TV) is exemplarily described as the display apparatus 100 hereinafter, embodiments of the present disclosure are not limited thereto. For example, the display apparatus 100 may be implemented using various apparatuses such as a monitor, a portable multimedia apparatus, and a portable communication apparatus. Any apparatus used to visually display an image may also be used as the display apparatus 100 without limitation.

As illustrated in FIG. 1, the display apparatus 100 may include a main body 101, a screen 102 configured to display an image I, and a stand 103 disposed under the main body 101 to support to the main body 101.

The main body 101 defines an appearance of the display apparatus 100 and may include parts used to display the image I or perform various functions of the display apparatus 100. Although the main body 101 illustrated in FIG. 1 has a flat shape, the shape of the main body 101 is not limited thereto. For example, the main body 101 may have a curved shape in which lateral ends thereof protrude forward and the center is curved.

The screen 102 disposed on the front surface of the main body 101 may display the image I including visual information. For example, the screen 102 may display a still or moving image, a two-dimensional planar image, or a three-dimensional image using binocular disparity of a user.

The screen 102 is provided with a plurality of pixels P, and the image I displayed on the screen 102 may be formed by a combination of light emitted from the plurality of pixels P. For example, the still image I may be formed on the screen 102 by combining light emitted from the plurality of pixels P as a mosaic.

The plurality of pixels P may emit light with various colors and luminance values. For example, the plurality of pixels P may include a red pixel R, a green pixel G, and a blue pixel B to form an image I having various colors. The red pixel R may emit red light with various luminance values, the green pixel G may emit green light with various luminance values, and the blue pixel B may emit blue light with various luminance values. The red light refers to light having a wavelength of about 620 nm (nano-meter, 1/million meter) to about 750 nm, the green light refers to light having a wavelength of about 495 nm to about 570 nm, and the blue light refers to light having a wavelength of about 450 nm to about 495 nm.

Each of the pixels P may generate light having various colors and luminance values by combining red light from the red pixel R, green light from the green pixel G, and blue light from the blue pixel B.

Although the screen 102 illustrated in FIG. 1 has a flat shape, the shape of the screen 102 is not limited thereto. For example, the screen 102 may have a curved shape in which lateral ends thereof protrude forward and the center is curved, in accordance with the shape of the main body 101.

The stand 103 may be installed under the main body 101 to stably support the main body 101 on the floor. Also, the stand 103 may be selectively installed on the rear surface of the main body 101 to firmly fix the main body 101 to a wall.

Although the stand 103 illustrated in FIG. 1 has a bar shape protruding forward from the lower portion of the main body 101, the shape of the stand 103 is not limited thereto and the stand 103 may have any shape so long as the main body 101 is stably supported by the stand 103.

Figure 2:
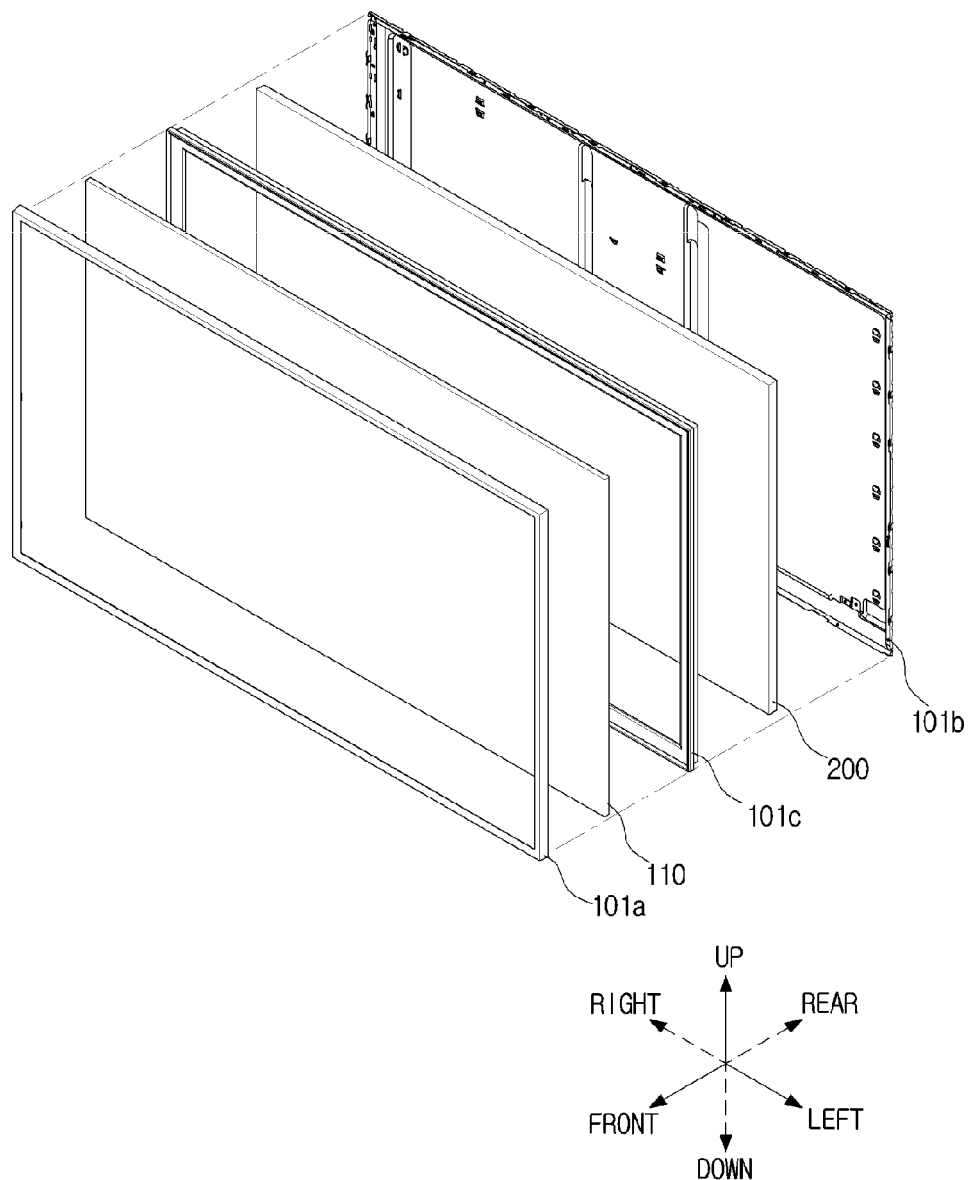
FIG. 2 is an exploded perspective view of a display apparatus according to an embodiment.

FIG. 2 is an exploded perspective view of a display apparatus according to an embodiment.

As illustrated in FIG. 2, the main body 101 may include various parts to generate an image I on the screen 102. For example, the main body 101 may include a back light unit 200 configured to emit surface light and an image forming unit 110 configured to generate an image I by transmitting or blocking light emitted from the back light unit 200.

The main body 101 may further include a front chassis 101a, a rear chassis 101b, and a mold frame 101c to fix the image forming unit 110 and the back light unit 200.

The front chassis 101a has a panel shape with an opening formed on the front surface thereof and the image I is displayed through the opening.

The rear chassis 101b has a box shape with an open front surface and holds the image forming unit 110 and the back light unit 200 constituting the display apparatus 100.

The mold frame 101c may be disposed between the front chassis 101a and the rear chassis 101b. Particularly, the mold frame 101c may be disposed between the image forming unit 110 and the back light unit 200 to fix the image forming unit 110 and the back light unit 200, respectively.

The back light unit 200 may include light sources configured to emit monochromatic light or white light and may refract, reflect, or scatter light emitted from the light sources to convert the light into uniform surface light. By refracting, reflecting, and scattering the light emitted from the light sources, the back light unit 200 may emit uniform surface light forward.

The image forming unit 110 is disposed in front of the back light unit 200 and blocks or transmits light emitted from the back light unit 200 to form an image I.

The front surface of the image forming unit 110 constitutes the screen 102 of the display apparatus 100 described above and includes a plurality of pixels P.

The plurality of pixels P included in the image forming unit 110 may each independently block or transmit light from the back light unit 200 and light passing through the plurality of pixels P forms the image I displayed on the display apparatus 100.

The image forming unit 110 may use a liquid crystal panel having optical properties that vary in accordance with an electric field.

Hereinafter, a liquid crystal panel will be described as an example of the image forming unit 110.

Figure 3:
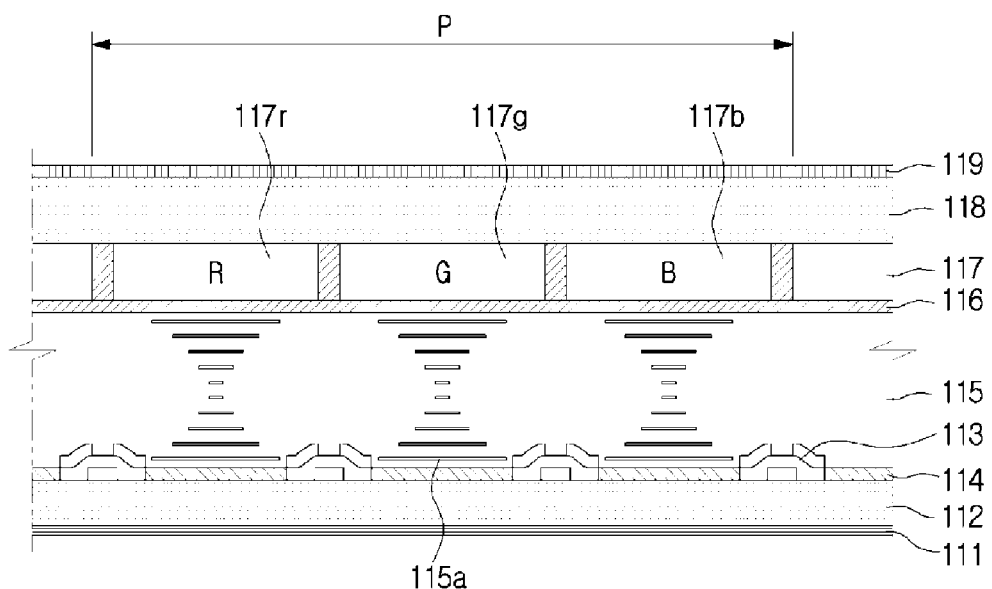
FIG. 3 is a side sectional view illustrating a pixel included in an image forming unit of a display apparatus according to an embodiment.

FIG. 3 is a side sectional view illustrating a pixel included in an image forming unit of a display apparatus according to an embodiment.

As illustrated in FIG. 3, the image forming unit 110 may include a first polarizing film 111, a first transparent substrate 112, a thin film transistor (TFT) 113, a pixel electrode 114, a liquid crystal layer 115, a common electrode 116, a color filter 117, a second transparent substrate 118, and a second polarizing film 119.

The first transparent substrate 112 and the second transparent substrate 118 may define an appearance of the image forming unit 110 and protect the liquid crystal layer 114 and the color filter 117 disposed between the first transparent substrate 112 and the second transparent substrate 118. The first and second transparent substrates 112 and 118 may be formed of tempered glass or transparent resin.

The first polarizing film 111 and the second polarizing film 119 are disposed on external surfaces of the first and second transparent substrates 112 and 118, respectively.

Light is made of a pair of electric and magnetic fields oscillating perpendicular to the direction of propagation. In addition, the electric and magnetic fields may oscillate in all directions perpendicular to the direction of propagation. In this case, a phenomenon in which the electric field or magnetic field oscillates in a given direction is referred to as polarization, and a film that transmits light having an electric or magnetic field oscillating in the given direction and blocks light having electric and magnetic fields oscillating in the other directions except for the given direction is referred to as a polarizing film. In other words, the polarizing film transmits light oscillating in one predetermined direction and blocks light oscillating in the other directions.

The first polarizing film 111 may transmit light having electric and magnetic fields oscillating in a first direction and may block the other light. Also, the second polarizing film 119 may transmit light having electric and magnetic fields oscillating in a second direction and may block the other light. In this case, the first direction is perpendicular to the second direction. In other words, an oscillating direction of light passing through the first polarizing film 111 is perpendicular to an oscillating direction of light passing through the second polarizing film 119. As a result, light cannot pass both the first polarizing film 111 and the second polarizing film 119.

The color filter 117 may be disposed on the internal surface of the second transparent substrate 11.

The color filter 117 may include a red filter 117r transmitting red light, a green filter 117g transmitting green light, and a blue filter 117b transmitting blue light. The red filter 117r, the green filter 117g, and the blue filter 117b may be aligned parallel to each other.

A region where the color filter 117 is formed corresponds to the pixel P described above. In addition, a region where the red filter 117r is formed corresponds to the red pixel R, a region where the green filter 117g is formed corresponds to the green pixel G, and a region where the blue filter 117b is formed corresponds to the blue pixel B. In other words, the red pixel R, the green pixel G, and the blue pixel B are defined by the red filter 117r, the green filter 117g, and the blue filter 117b, respectively, and a combination of the red filter 117r, the green filter 117g, and the blue filter 117b constitutes the pixel P.

The TFT 113 is disposed at the internal surface of the first transparent substrate 112.

Particularly, the TFT 113 may be disposed at positions corresponding to gaps between the red filter 117r, the green filter 117g, and the blue filter 117b. In other words, the TFTs 113 may be disposed between the red pixel R, the green pixel G, and the blue pixel B.

The TFT 113 may allow current to flow in the pixel electrode 114 or block the current, which will be described later. In accordance with turning on (closing) or turning off (opening) of the TFT 113, an electric field may be formed between the pixel electrode 114 and the common electrode 116 or removed therefrom, respectively. The TFT 113 may be formed of poly-silicon and manufactured by a semiconductor process such as lithography, deposition, and ion implantation.

The pixel electrode 114 may be formed on the first transparent substrate 112 at an inner position than the TFT 113, and the common electrode 116 is formed on the second transparent substrate 118 at an inner portion than the color filter 117.

The pixel electrode 114 and the common electrode 116 are formed of electrically conductive metallic materials and may form an electric field to change the alignment of liquid crystal molecules 115a constituting the liquid crystal layer 115, which will be described later.

The pixel electrode 114 is formed at regions corresponding to the red filter 117r, the green filter 117g, and the blue filter 117b, and the common electrode 116 may be formed on the entire surface of the panel. As a result, electric fields may be formed selectively at the regions corresponding to the red filter 117r, the green filter 117g, and the blue filter 117b in the liquid crystal layer 115.

The pixel electrode 114 and the common electrode 116 are formed of transparent materials and may transmit external light incident thereon. The pixel electrode 114 and the common electrode 116 may be formed of indium tin oxide (ITO), indium zinc oxide (IZO), silver (Ag) nano wire, carbon nano tube (CNT), graphene, poly(3,4-ethylenedioxythiophene) (PEDOT), or the like.

The liquid crystal layer 115 is formed between the pixel electrode 114 and the common electrode 116, and the liquid crystal layer 115 is filled with the liquid crystal molecules 115a.

Liquid crystals are matter in a state which has properties between those of liquids and those of solid (crystals). In general, phase transition from a solid state of a material to a transparent liquid state is observed at a melting point by applying heat thereto. In contrast, heating drives a solid state of a liquid crystal material into an opaque and cloudy liquid state at a melting point of the liquid crystal and then into a transparent liquid state. The term "liquid crystal' also refers to an intermediate phase between a solid phase and a liquid phase or a material having this liquid crystal phase.

Most of the liquid crystal materials are organic compounds and include long rod-shaped molecules. The alignment of molecules thereof may be non-uniform in one direction, but the molecules may have a uniform crystalline structure in another direction. As a result, the liquid crystal has fluidity of a liquid and optical anisotropy of a crystal (solid).

Also, the liquid crystal may have optical properties that vary in accordance with an electric field. For example, the orientation of liquid crystal molecules constituting the liquid crystal changes in accordance with the electric field. By the electric field formed in the liquid crystal layer 115, the liquid crystal molecules 115a of the liquid crystal layer 115 are aligned in accordance with the orientation of the electric field. If the electric field is not formed in the liquid crystal layer 115, the liquid crystal molecules 115a may be non-uniformly arranged or may be aligned along an alignment layer (not shown).

As a result, optical properties of the image forming unit (liquid crystal panel) 110 may vary in accordance with the existence of the electric field of the liquid crystal layer 115.

For example, when the electric field is not formed in the liquid crystal layer 115, light polarized by the first polarizing film 111 may pass the second polarizing film 119 due to the alignment of the liquid crystal molecules 115a of the liquid crystal layer 115. In other words, if the electric field is not formed in the liquid crystal layer 115, the image forming unit 110 may transmit light in the pixel P.

On the other hand, when the electric field is formed in the liquid crystal layer 115, light polarized by the first polarizing film 111 cannot pass through the second polarizing film 119 due to the alignment of the liquid crystal molecules 115a of the liquid crystal layer 115. In other words, light is blocked by the image forming unit 110 in the pixel P if the electric field is formed in the liquid crystal layer 115.

As described above, the image forming unit 110 may control light transmission on the basis of pixel P (more particularly, independently on the basis of red, green, and blue pixels included in the pixel P). As a result, light from the plurality of pixels P is combined, and the image I may be displayed on the screen 102 of the display apparatus 100.

The back light units 200 may be classified into direct-type back light units and edge-type back light units according to the position of a light source.

Figure 4:
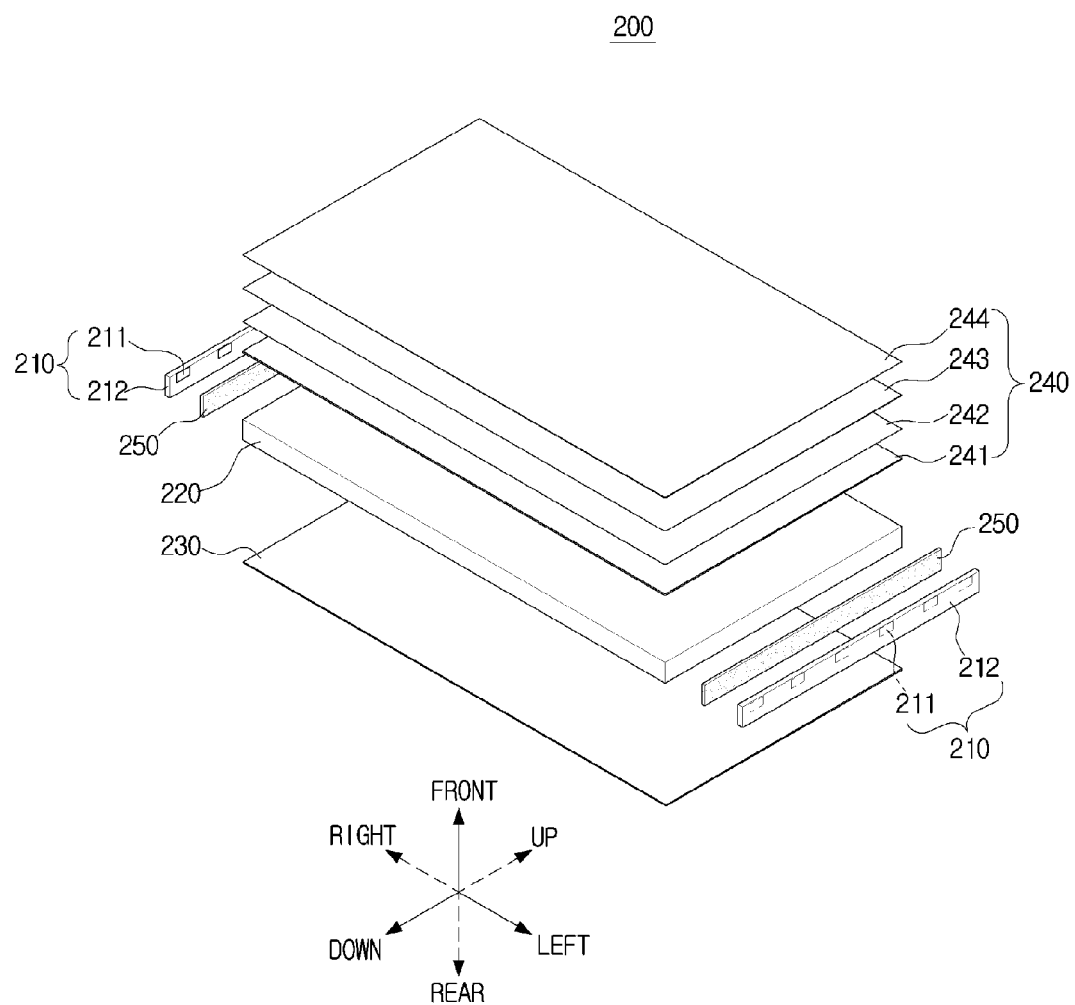
FIG. 4 is an exploded view of a back light unit according to an embodiment.
Figure 5:
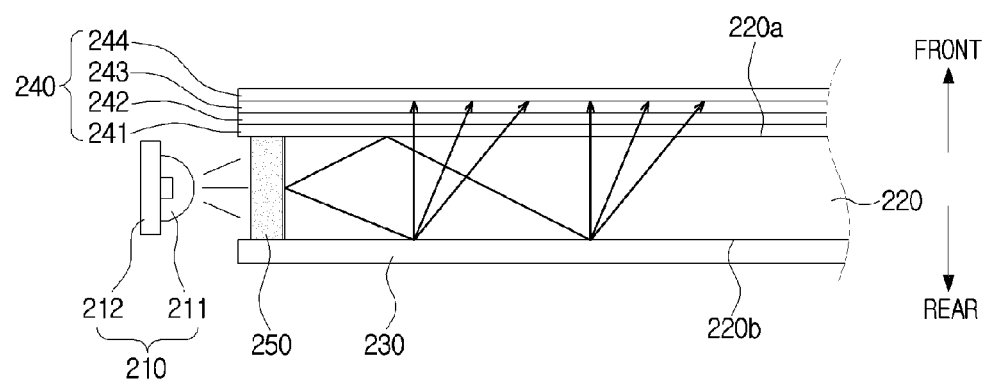
FIG. 5 is a side sectional view of the back light unit.
Figure 6:
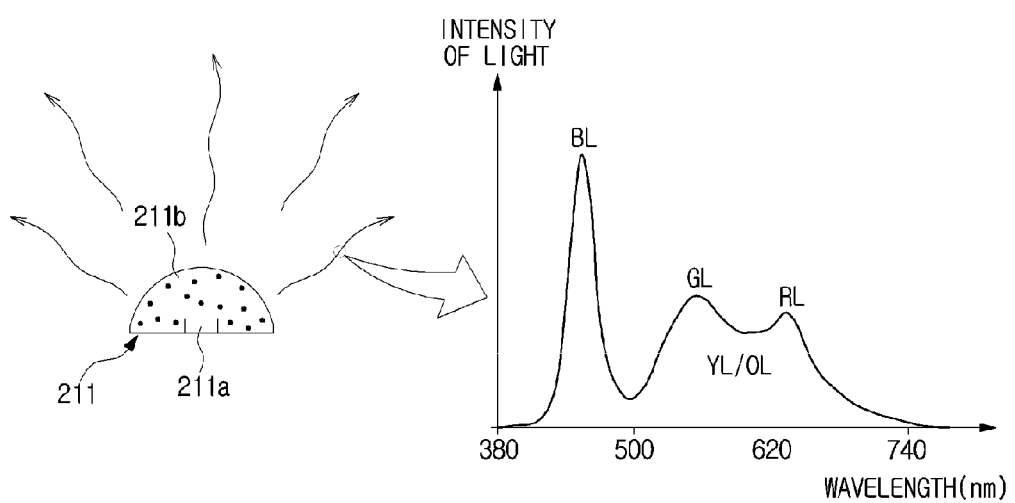
FIG. 6 is a view illustrating spectrum of light emitted from a light source included in the back light unit.

FIG. 4 is an exploded view of a back light unit according to an embodiment. FIG. 5 is a side sectional view of the back light unit. FIG. 6 is a view illustrating spectrum of light emitted from a light source included in the back light unit.

Referring to FIGS. 4, 5, and 6, an edge-type back light unit 200 includes a light emitting module 210 configured to generate light, a waveguide plate 220 configured to uniformly diffuse light, a reflection sheet 230 configured to reflect light, optical sheet 240 configured to improve luminance, and a selective light absorption sheet 250 configured to selectively absorb light in accordance with wavelength.

The light emitting module 210 may include a plurality of light sources 211 configured to emit light and a support 212 configured to support and fix or hold the plurality of light sources 211.

The plurality of light sources 211 may be uniformly arranged at both sides of the back light unit 200 as illustrated in FIG. 4 and emit light toward the center of the back light unit 200.

The plurality of light sources 211 may be arranged to be spaced apart from each other at equal intervals to obtain uniform luminance of the emitted light. For example, the plurality of light sources 211 may be arranged at both sides of the back light unit 200 at equal intervals as illustrated in FIG. 4. However, the arrangement of the light sources 211 is not limited to that illustrated in FIG. 4, and the plurality of light sources 211 may also be arranged at one of the both sides of the back light unit 200.

The light source 211 may include a device capable of emitting monochromatic light (light of one color, for example, blue light) or white light (combination of various wavelengths) in various directions upon supply of power. For example, the light source 211 may be implemented using a light emitting diode (LED) or a cold cathode fluorescence lamp (CCFL) generating less heat.

For example, the light source 211 may include a blue LED 211a configured to emit high energy blue light and a phosphor 211b configured to absorb blue light and emit green and red light as illustrated on the left in FIG. 6.

The blue LED 211a of the light source 211 may be manufactured using an indium-gallium-nitrogen compound (InGaN) prepared by adding indium (In) to a gallium-nitrogen compound (GaN).

The phosphor 211b may convert energy absorbed from the outside into visible light and emit the visible light. The phosphor 211b may include a yellow phosphor (YAG), a KSF phosphor ($K_2SiF_6$), or a KTF phosphor ($K_2SiF_6$).

The light source 211 may emit blue light BL having a wavelength of about 450 nm, green light GL having a wavelength of about 535 nm, and red light having a wavelength of about 620 nm. However, the light source 211 does not emit only blue light BL, green light GL, and red light RL. As illustrated on the right of FIG. 6, the light source 211 may also emit yellow light YL or orange light OL as well as the blue light BL, green light GL, and red light RL.

The support 212 may fix the plurality of light sources 211 to prevent dislocation of the light sources 211. In addition, the support 212 may supply power to each of the light sources 211 to emit light.

The support 212 may be located at a side of the back light unit 200 together with the light sources 211. For example, as illustrated in FIG. 4, the support 212 may be disposed at both sides of the back light unit 200. However, the positions of the support 212 are not limited thereto, and the support 212 may be disposed at one of the both sides of the back light unit 200. The support 212 may be formed of a synthetic resin provided with conductive power supply lines or a printed circuit board (PCB) to fix the plurality of light sources 211 and supply power to the light source 211.

The waveguide plate 220 changes the proceeding direction of incident light from the light emitting module 210 disposed at one side to emit light forward. Also, the waveguide plate 220 may diffuse incident light from the light emitting module 210 toward a front surface 220a of the waveguide plate 220.

The front surface 220a of the waveguide plate 220 may have a plurality of protruding stripes to change the proceeding direction of light, and a rear surface 220b of the waveguide plate 220 may have a plurality of dots. In addition, the size of the strips and intervals there-between and the size of the dots and intervals there-between may be adjusted to emit uniformly diffused light toward the front surface 220a of the waveguide plate 220. In addition, the protruding stripes may be embossed on the front surface 220a of the waveguide plate 220 by printing, and the dots may be engraved on the rear surface 220b of the waveguide plate 220 by laser beams.

Since the light emitting module 210 is disposed at sides of the back light unit 200 as described above, luminance may become non-uniform depending on the position of the light emitting module 210. Thus, the waveguide plate 220 may diffuse light emitted from the light emitting module 210 within the waveguide plate 220 to remove non-uniformity of luminance caused by the position of the light emitting module 210. For example, the waveguide plate 220 may have a milky color to diffuse light.

Light incident into the waveguide plate 220 may proceed in various directions in accordance with angle of incidence. For example, as illustrated in FIG. 5, incident light proceeding toward the front surface 220a of the waveguide plate 220 may be reflected by the front surface 220a to proceed toward the rear surface 220b of the waveguide plate 220 or refracted at the front surface 220a of the waveguide plate 220 to be incident on the optical sheet 240. Also, incident light proceeding toward the rear surface 220b of the waveguide plate 220 may be reflected by the rear surface 220b of the waveguide plate 220 or scattered by the dots formed on the rear surface 220b of the waveguide plate 220 to proceed toward the front surface 220a of the waveguide plate 220.

Light incident on side surfaces of the waveguide plate 220 may proceed to the center of the waveguide plate 220 via reflection of light occurring at the front surface 220a and the rear surface 220b of the waveguide plate 220. In addition, light proceeding within the waveguide plate 220 may be emitted through the front surface 220a of the waveguide plate 220 via scattering of light occurring at the rear surface 220b of the waveguide plate 220 and refraction of light occurring at the front surface 220a of the waveguide plate 220.

The waveguide plate 220 may include poly methyl methacrylate (PMMA), transparent polycarbonate (PC), or the like.

The selective light absorption sheet 250 may be disposed between the light emitting module 210 and the waveguide plate 220. For example, the selective light absorption sheet 250 may be attached to a side surface 220c of the waveguide plate 220.

The selective light absorption sheet 250 may selectively absorb light of a predetermined wavelength range among light emitted from the light emitting module 210. For example, the selective light absorption sheet 250 may include a selective light absorption material capable of selectively absorbing yellow light or orange light having a wavelength of about 570 nm to about 610 nm.

The reflection sheet 230 is disposed behind the waveguide plate 220 to reflect light passing through the rear surface 220b of the waveguide plate 220 toward the waveguide plate 220.

The reflection sheet 230 may be manufactured by coating a highly reflective material on a base material. For example, the reflection sheet 230 may be manufactured by coating a polymer having a high reflectivity on a base material of polyethylene terephthalate (PET), or the like.

The optical sheet 240 may include various sheets to improve luminance and uniformity of luminance. For example, the optical sheet 240 may include a diffuser film 241, a first prism film 242, a second prism film 243, and a reflective polarizing film 244.

The diffuser film 241 diffuses light to improve uniformity of luminance. Light emitted from the light sources 211 is diffused by the waveguide plate 220 and further diffused by the diffuser film 241 included in the optical sheet 240.

Light passing through the diffuser film 241 is diffused in a direction parallel to the diffuser film 241, and thus luminance may be reduced.

The first and second prism films 242 and 243 may focus light diffused by the diffuser film 241 to improve luminance.

The first and second prism films 242 and 243 may have triangular prism patterns, and a plurality of prism patterns are arranged adjacent to each other to form a plurality of bands. In this case, the arrangement direction of the prism patterns of first prism film 242 may be perpendicular to that of the prism patterns of the second prism film 243.

Light passing through the first and second prism films 242 and 243 has a viewing angle of about 70 degrees and luminance thereof may be improved as the light proceeds toward the front of the back light unit 200.

The reflective polarizing film 244, one of the polarizing films, may transmit some light beams incident thereon and reflect the other light beams to improve luminance. For example, the reflective polarizing film 244 may transmit light of a predetermined polarization direction and reflect light of the other directions. A polarization direction of the reflective polarizing film 244 may be the same as that of the first polarizing film 111 described above. As a result, light passing through the reflective polarizing film 244 may also pass through the first polarizing film 111 included in the image forming unit 110.

Light reflected by the reflective polarizing film 244 is recycled in the back light unit 200, and luminance of the display apparatus 100 may be increased by this recycling of light.

The optical sheet 240 is not limited to the sheets or films illustrated in FIG. 5 and may further include various other sheets or films such as a protective sheet.

Figure 7:
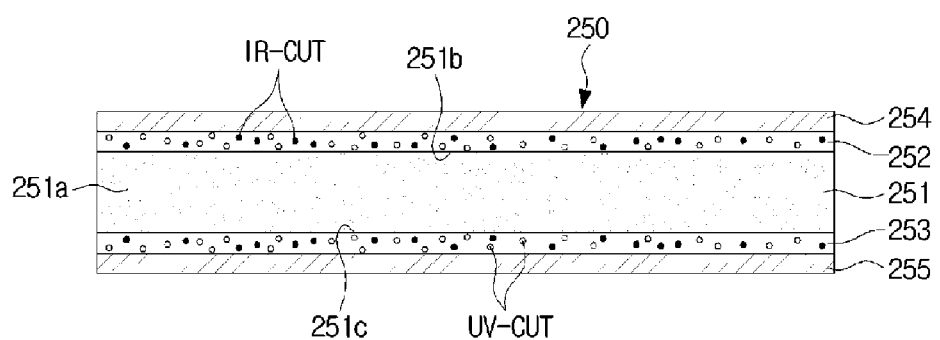
FIG. 7 illustrates a selective light absorption sheet included in the back light unit.
Figure 8:
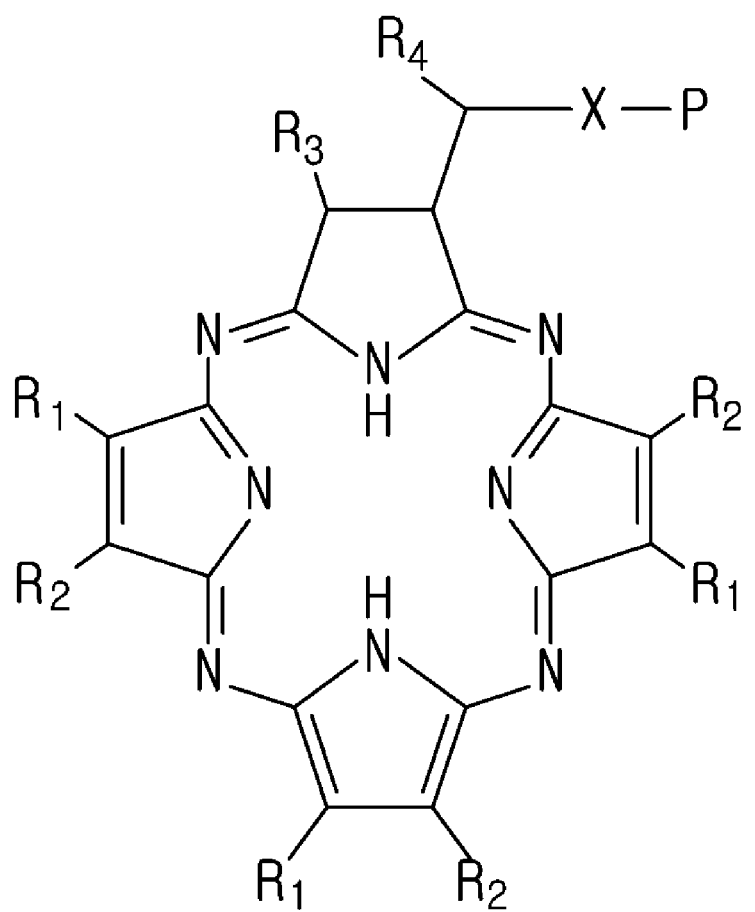
FIG. 8 illustrates a molecular structure of a selective light absorption material included in the back light unit.
Figure 9:
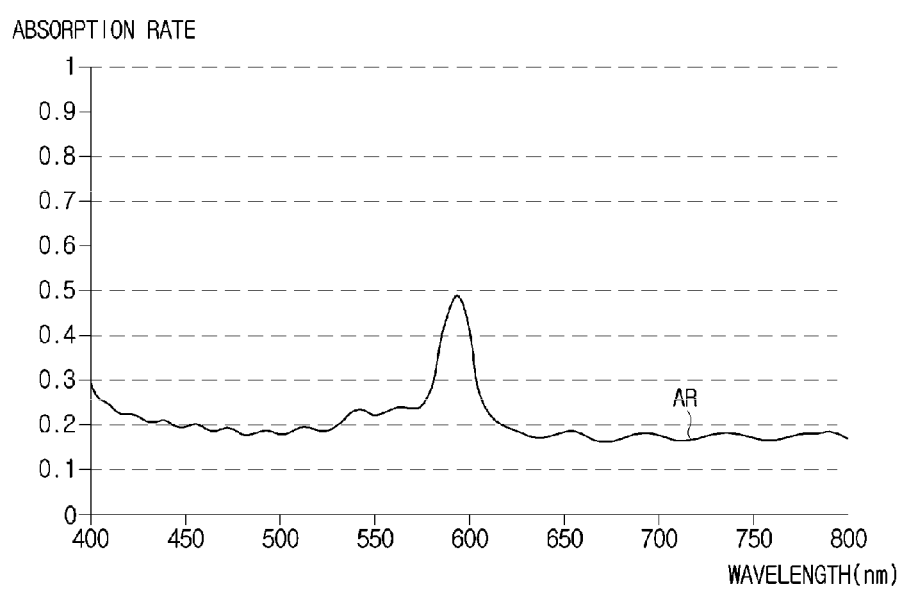
FIG. 9 is a graph illustrating a spectrum of light absorbed by the selective light absorption sheet included in the back light unit.

FIG. 7 illustrates a selective light absorption sheet included in the back light unit. FIG. 8 illustrates a molecular structure of a selective light absorption material included in the back light unit. FIG. 9 is a graph illustrating a spectrum of light absorbed by the selective light absorption sheet included in the back light unit.

To enhance color reproduction of the display apparatus 100, each color pixel (R, G, and B) should emit light of colors close to primary colors (red, green, and blue).

Each of the color pixels (R, G, and B) may emit light of colors close to the primary colors (red, green, and blue), when the red filter 117$r$ (FIG. 3), the green filter 117$g$ (FIG. 3), and the blue filter 117$b$ (FIG. 3) included in the color filter 117 (FIG. 3) transmit only red light, green light, and blue light, respectively, or when the light source 211 emits only red light, green light, and blue light.

In general, however, the color filter 117 transmits light having wavelengths around those of red light, green light and blue light as well as red, green, and blue light. For example, the red filter 117$r$ transmits orange light having similar wavelengths to that of red light as well as red light, the green filter 117$g$ transmits yellow light having similar wavelengths to that of green light as well as green light, and the blue filter 117$b$ transmits violet light having similar wavelengths to that of blue light as well as blue light.

Similarly, the light source 211 may emit light having wavelengths around those of red light, green light, and blue light as well as red, green, and blue light. For example, a light source 211 including a blue LED and a red/green phosphor may also emit yellow light in addition to red, green, and blue light due to the red/green phosphor.

As such, the light source 211 emits yellow light or orange light in addition to red light, green light, and blue light, and the color filter 117 transmits the yellow light or orange light as well as the red light, green light, and blue light, the yellow light or orange light may be output via the green pixel G or the red pixel R. As a result, color reproduction of the display apparatus 100 may be reduced.

The selective light absorption sheet 250 may enhance color reproduction of the display apparatus 100 by absorbing yellow light or orange light among light emitted from the light emitting module 210.

The selective light absorption sheet 250 may include a selective light absorption film 251, light blocking films 252 and 253, and barrier films 254 and 255 as illustrated in FIG. 7.

The selective light absorption film 251 may selectively absorb yellow light or orange light. For example, the selective light absorption film 251 may include a selective light absorption material 251$a$ capable of selectively absorbing light having a wavelength ranging from about 570 nm to about 610 nm.

Examples of the selective light absorption material 251$a$ may include tetra-aza-porphyrin (TAP) well known in the art as porphyrazine.

TAP is a tetrapyrrole macrocycle similar to porphyrin and phthalocyanine. Particularly, TAP has a cyclic structure including 8 nitrogen atoms (N) and four pairs of bases R1 and R2, a plurality of carbon atoms (C), and hydrogen atoms (H). Also, TAP is well known as a substance absorbing ultraviolet light, red light, and near-infrared light. Particularly, TAP may absorb light having a wavelength in the range of about 300 nm to about 400 nm and light having a wavelength of 600 nm or higher.

Optical properties of TAP may be changed by replacing one of the four pairs of basses R1 and R2 with a metal atom (X) and a phosphorus atom (P) as illustrated in FIG. 8. Particularly, TAP may absorb light having a wavelength in the range of about 570 nm to about 610 nm far more than the other wavelengths of light.

For example, if the metal atom (X) includes at least one of copper (Cu), chromium (Cr), vanadium (V), and molybdenum (Mo), TAP may absorb light having a wavelength in the range of about 570 nm to about 610 nm far more than the other wavelengths of light. TAP may absorb light having a designated wavelength far more than the other wavelengths of light by using an additional function group in addition to the metal atom (X).

Light having a wavelength of about 570 nm to about 610 nm may be yellow light and orange light. TAP may absorb yellow light and orange light more by using at least one of Cu, Cr, V, and Mo as the metal atom.

In addition, since TAP does not absorb or partially absorbs light having a wavelength out of the above range. Thus, light having a wavelength out of the range of about 570 nm to about 610 nm may not be absorbed by TAP but pass through TAP.

The selective light absorption film 251 including TAP may have an absorption rate (AR) as illustrated in FIG. 9. Referring to FIG. 9, the selective light absorption film 251 has a considerably high absorption rate in the range of about 570 nm to about 610 nm. Particularly, while the absorption rate of the selective light absorption film 251 is about 20% at a wavelength out of the range about 570 nm to about 610 nm, the absorption rate of the selective light absorption film 251 rapidly increases in the range of about 570 nm to about 610 nm and reaches about 50% or greater at about 585 nm.

FIG. 9 exemplarily illustrates the absorption rates of the selective light absorption film 251, and the absorption rates of the selective light absorption film 251 are not limited thereto. For example, the wavelength where the maximum value of the absorption rate of the selective light absorption film 251 is observed may not be limited to 585 nm, and the maximum value of the absorption rate of the selective light absorption film 251 may be observed at any wavelength of yellow light or orange light in the range of about 570 nm to about 610 nm. Also, the maximum value of the absorption rate of the selective light absorption film 251 is not limited to 50% and may be less or greater than 50%.

The light blocking films 252 and 253 may block ultraviolet (UV) light and/or infrared (IR) light and may include an UV-cut material (UV-CUT) and/or an IR-cut material (IR-CUT). The UV-cut material (UV-CUT) may absorb or reflect UV light, and the IR-cut material (IR-CUT) may absorb or reflect IR light.

The light blocking films 252 and 253 may be attached to external surfaces 251b and 251c of the selective light absorption film 251, respectively. For example, a first light blocking film 252 may be attached to a first surface 251b of the selective light absorption film 251 and the second light blocking film 253 may be attached to a second surface 251c thereof.

As a result, the light blocking films 252 and 253 may block incidence of UV light and/or IR light on the selective light absorption film 251. In other words, the light blocking films 252 and 253 may prevent the selective light absorption film 251 from absorbing UV light and/or IR light.

The selective light absorption material 251a that is an organic material may deteriorate as caused by light or heat and thereby lose the functions thereof. Furthermore, as described above with reference to FIGS. 4 and 5, the selective light absorption sheet 250 is disposed adjacent to the light sources 211 and light emitted from the light sources 211 directly reaches the selective light absorption sheet 250. As a result, the selective light absorption film 251 may quickly deteriorate by light emitted from the light source 211.

Thus, the light blocking films 252 and 253, which block UV light having and/or IR light generating thermal energy, may be provided to prevent deterioration of the selective light absorption film 251.

The barrier films 254 and 255 may block impurities such as moisture and/or oxygen.

The barrier films 254 and 255 may include a polyvinylidene chloride (PVDC) film, an ethylene vinyl alcohol (EVOH) film, or the like to block moisture and/or oxygen. Also, the barrier films 254 and 255 may be manufactured by laminating a polyethylene (PE) film on an EVOH film, or laminating a PE film or polypropylene (PP) film on a polyethylene terephthalate (PET) film.

The barrier films 254 and 255 may be attached to external surfaces of the first and second light blocking films 252 and 253, respectively. For example, a first barrier film 254 may be attached to the external surface of the first light blocking film 252, and a second barrier film 255 may be attached to the external surface of the second light blocking film 253.

As a result, the barrier films 254 and 255 may prevent the selective light absorption film 251 from being exposed to moisture and/or oxygen.

As described above, the selective light absorption material 251a may deteriorate by light or heat and thereby lose functions thereof. In this case, moisture and/or oxygen may serve as a catalyst for deterioration of the selective light absorption material 251a by light or heat. In other words, the selective light absorption material 251a may deteriorate more quickly by moisture and/or oxygen.

Due to these reasons, the barrier films 254 and 255 block moisture and/or oxygen may be provided to prevent deterioration of the selective light absorption film 251.

As described above, the first light blocking film 252 and the first barrier film 254 may be attached to the first surface 251b of the selective light absorption film 251, and the second light blocking film 253 and the second barrier film 255 may be attached to the second surface 251c to prevent deterioration of the selective light absorption film 251.

However, the selective light absorption sheet 250 illustrated in FIG. 7 is an example, and the structure of the selective light absorption sheet 250 is not limited thereto.

FIGS. 10, 11, 12, 13, 14, 15, and 16 illustrate other examples of the selective light absorption sheet included in the back light unit.

Figure 10:
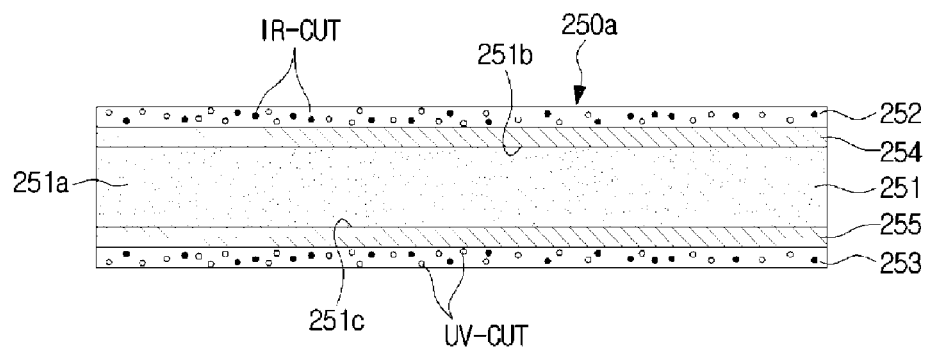
FIGS. 10, 11, 12, 13, 14, 15, and 16 illustrate other examples of the selective light absorption sheet included in the back light unit.

As illustrated in FIG. 10, a selective light absorption sheet 250a may include the selective light absorption film 251, the light blocking films 252 and 253, and the barrier films 254 and 255.

The barrier films 254 and 255 may be attached to the external surfaces 251b and 251c of the selective light absorption film 251, and the light blocking films 252 and 253 may be attached to external surfaces of the barrier films 254 and 255. For example, the first barrier film 254 may be attached to the first surface 251b of the selective light absorption film 251, and the second barrier film 255 may be attached to the second surface 251c. In addition, the first light blocking film 252 may be attached to the external surface of the first barrier film 254, and the second light blocking film 253 may be attached to the external surface of the second barrier film 255.

As a result, incidence of UV light and IR light on the selective light absorption film 251 may be prevented and exposure of the selective light absorption film 251 to moisture and/or oxygen may be inhibited.

Figure 11:
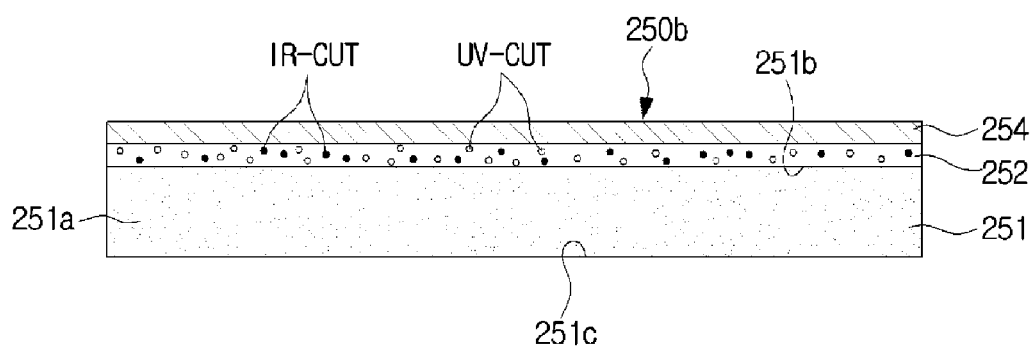

Alternatively, as illustrated in FIG. 11, a selective light absorption sheet 250b may include the selective light absorption film 251, the light blocking film 252, and the barrier film 254.

The light blocking film 252 may be attached to the first surface 251b of the selective light absorption film 251, and the barrier film 254 may be attached to the external surface of the light blocking film 252.

The second surface 251c of the selective light absorption film 251 may be attached to a side surface 220c (FIG. 5) of the waveguide plate 220 (FIG. 5). Thus, the light blocking film 252 and the barrier film 254 face the light sources 211, and UV light and/or IR light included in light emitted from the light sources 211 are blocked by the light blocking film 252. Also, moisture and/or oxygen is blocked by the barrier film 254.

The barrier film 254 may be attached to the first surface 251b of the selective light absorption film 251, and the light blocking film 252 may be attached to the external surface of the barrier film 254.

Figure 12:
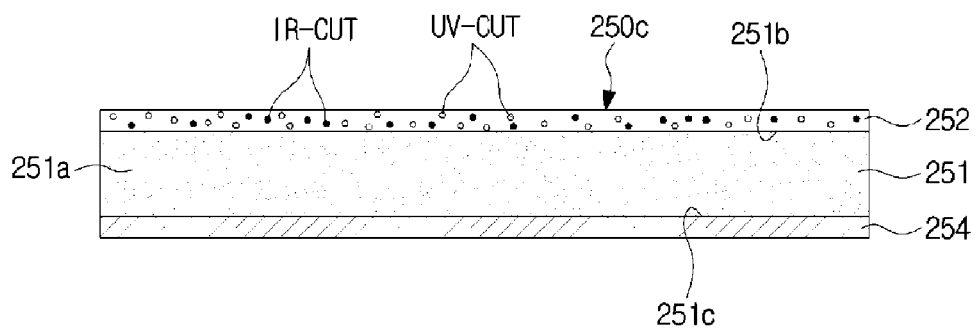

Alternatively, as illustrated in FIG. 12, a selective light absorption sheet 250c may include the selective light absorption film 251, the light blocking film 252, and the barrier film 254.

The light blocking film 252 may be attached to the first surface 251b of the selective light absorption film 251, and the barrier film 254 may be attached to the second surface 251c of the selective light absorption film 251.

The barrier film 254 may be attached to the side surface 220c (FIG. 5) of the waveguide plate 220 (FIG. 5). Thus, the light blocking film 252 faces the light sources 211, and UV light and/or IR light included in light emitted from the light sources 211 are blocked by the light blocking film 252. Also, moisture and/or oxygen are blocked by the barrier film 254.

Figure 13:
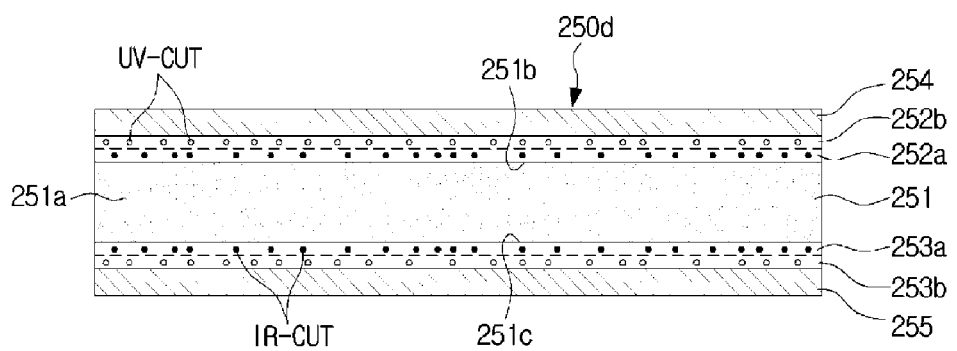

Alternatively, as illustrated in FIG. 13, a selective light absorption sheet 250d may include the selective light absorption film 251, IR-cut films 252a and 253a, UV-cut films 252b and 2536b, and the barrier films 254 and 255.

The IR-cut films 252a and 253a may block IR light and may include an IR-cut material (IR-CUT). The IR-cut material (IR-CUT) may absorb or reflect IR light. The IR-cut films 252a and 253a may be attached to the external surfaces 251b and 251c of the selective light absorption film 251, respectively.

The UV-cut films 252b and 253b may block UV light and may include an UV-cut material (UV-CUT). The UV-cut material (UV-CUT) may absorb or reflect UV light. The UV-cut films 252b and 253b may be attached to external surfaces of the IR-cut films 252a and 253a, respectively.

The barrier films 254 and 255 may block moisture and/or oxygen and may be attached to external surfaces of the UV-cut films 252b and 253b, respectively.

The order of laminating the IR-cut films 252a and 253a and the UV-cut films 252b and 253b may be inverted. For example, the UV-cut films 252b and 253b may be attached to the external surfaces 251b and 251c of the selective light absorption film 251, respectively, and the IR-cut films 252a and 253a may be attached to external surfaces of the UV-cut films 252b and 253b, respectively.

Figure 14:
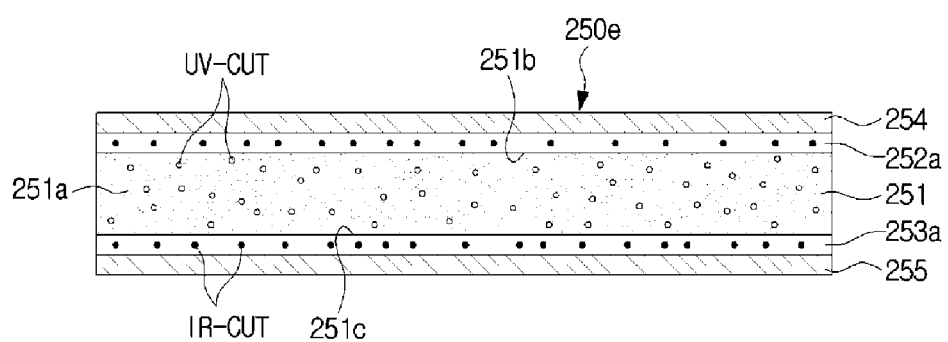

Alternatively, as illustrated in FIG. 14, a selective light absorption sheet 250e may include the selective light absorption film 251, the IR-cut films 252a and 253a, and the barrier films 254 and 255.

The selective light absorption film 251 may include a selective light absorption material 251a and an UV-cut material (UV-CUT). The selective light absorption material 251a may absorb yellow light or orange light and the UV-cut material (UV-CUT) may absorb UV light among light incident on the selective light absorption film 251. As the UV-cut material (UV-CUT) absorbs UV light, deterioration of the selective light absorption material 251a by UV light may be prevented.

The IR-cut films 252a and 253a may be attached to the external surfaces 251b and 251c of the selective light absorption film 251, respectively and may include an IR-cut material (IR-CUT) capable of blocking IR light. The IR-cut material (IR-CUT) may absorb or reflect IR light. As the IR-cut films 252a and 253a absorb or reflect IR light, deterioration of the selective light absorption material 251a caused by IR light may be prevented.

The barrier films 254 and 255 may block moisture and/or oxygen and may be attached to the external surfaces of the IR-cut films 252a and 253a, respectively.

Figure 15:
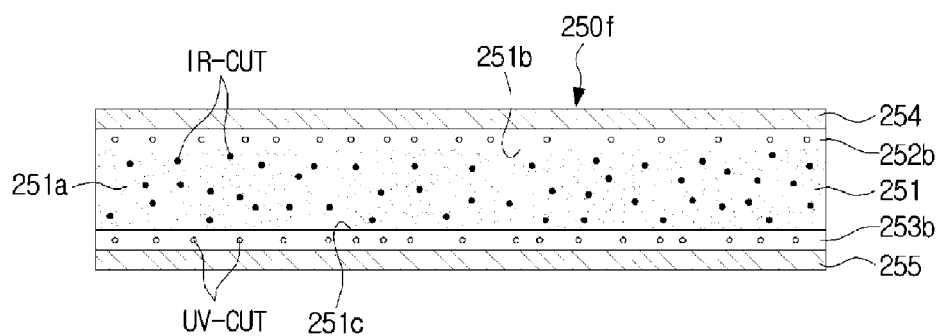

Alternatively, as illustrated in FIG. 15, a selective light absorption sheet 250f may include the selective light absorption film 251, the UV-cut films 252b and 253b, and the barrier films 254 and 255.

The selective light absorption film 251 may include a selective light absorption material 251a and an IR-cut material (IR-CUT). The selective light absorption material 251a may absorb yellow light or orange light and the IR-cut material (IR-CUT) may absorb IR light among light incident on the selective light absorption film 251. As the IR-cut material (IR-CUT) absorbs IR light, deterioration of the selective light absorption material 251a caused by IR light may be prevented.

The UV-cut films 252b and 253b may be attached to the external surfaces 251b and 251c of the selective light absorption film 251, respectively and may include an UV-cut material (UV-CUT) capable of blocking UV light. The UV-cut material (UV-CUT) may absorb or reflect UV light. As the UV-cut films 252b and 253b absorb or reflect UV light, deterioration of the selective light absorption material 251a caused by UV light may be prevented.

The barrier films 254 and 255 may block moisture and/or oxygen and may be attached to the external surfaces of the UV-cut films 252b and 253b, respectively.

Figure 16:
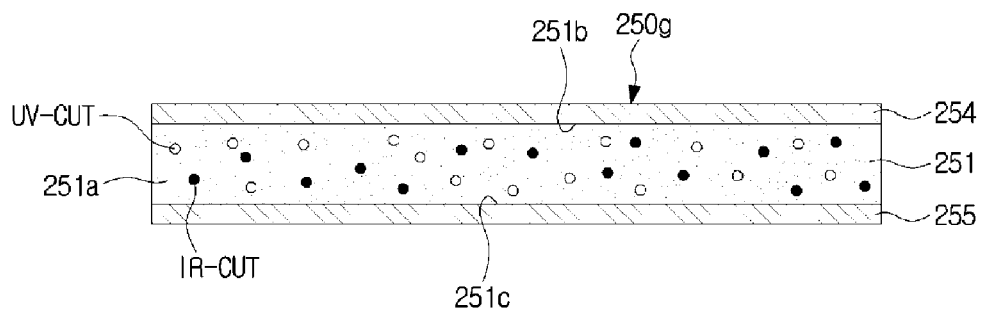

Alternatively, as illustrated in FIG. 16, a selective light absorption sheet 250g may include the selective light absorption film 251 and the barrier films 254 and 255.

In this case, the selective light absorption film 251 may include a selective light absorption material 251a, an IR-cut material (IR-CUT), and an UV-cut material (UV-CUT). The selective light absorption material 251a may absorb yellow light or orange light, the IR-cut material (IR-CUT) may absorb IR light, and the UV-cut material (UV-CUT) may absorb UV light among light incident on the selective light absorption film 251. As the IR-cut material (IR-CUT) and the UV-cut material (UV-CUT) absorb IR light and UV light, respectively, deterioration of the selective light absorption material 251a caused by IR light and/or UV light may be prevented.

The barrier films 254 and 255 may block moisture and/or oxygen and may be attached to the external surfaces 251b and 251c of the selective light absorption film 251, respectively.

As described above, the selective light absorption sheet 250 may include the selective light absorption film 251 absorbing yellow light and/or orange light and may have various structures to prevent deterioration of the selective light absorption film 251 caused by UV light, IR light, moisture and/or oxygen, and the like.

Also, by blocking UV light, IR light, moisture and/or oxygen, and the like, lifespan of the selective light absorption film 251 may be prolonged and reliability of the back light unit 200 and the display apparatus 100 may be improved.

Figure 17:
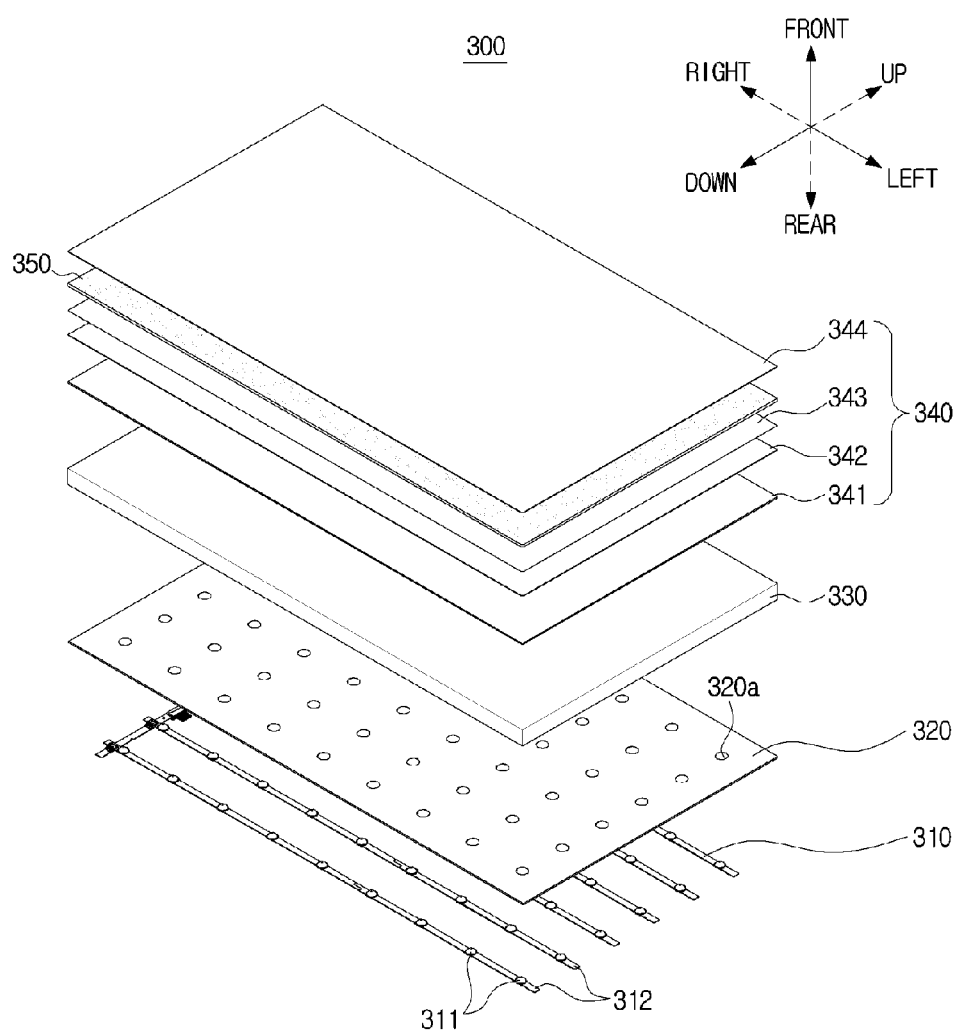
FIG. 17 is an exploded view of a back light unit according to another embodiment.
Figure 18:
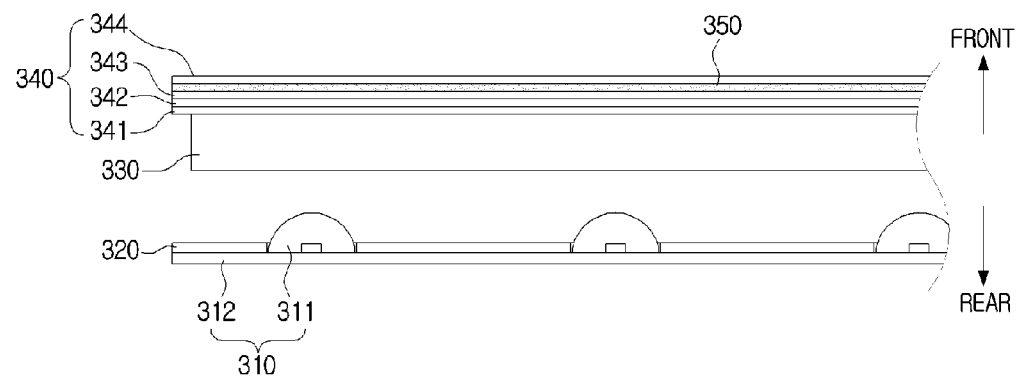
FIG. 18 is a side sectional view illustrating the back light unit.
Figure 19:
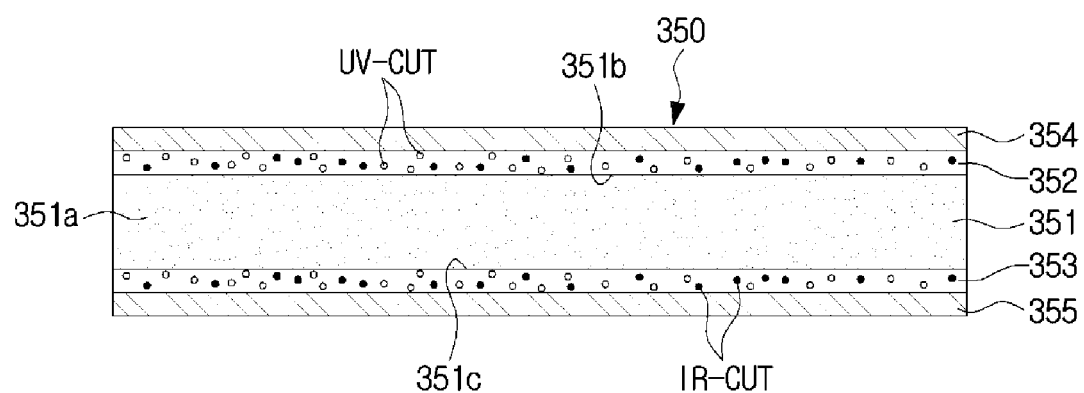
FIG. 19 illustrates a selective light absorption sheet included in the back light unit.

FIG. 17 is an exploded view of a back light unit according to another embodiment. FIG. 18 is a side sectional view illustrating a back light unit. FIG. 19 illustrates a selective light absorption sheet included in the back light unit.

Referring to FIGS. 17, 18 and 19, a direct-type back light unit 300 includes a light emitting module 310 configured to generate light, a reflection sheet 320 configured reflect light, a diffuser plate 330 configured to distribute light, and an optical sheet 340 configured to improve luminance.

The light emitting module 310 may include a plurality of light sources 311 configured to emit light and a support 312 configured to support and fix the plurality of light sources 311.

The plurality of light sources 311 may be arranged at regular intervals at the rear of the back light unit 300 as illustrated in FIG. 17 and emit light forward.

The plurality of light sources 311 may be arranged in a predetermined pattern to obtain uniform luminance of the emitted light. The plurality of light sources 311 may be arranged at equal intervals. For example, rows and columns of the plurality of light sources 311 may be adjusted such that four adjacent light sources form a square as illustrated in FIG. 17. However, the pattern of the plurality of light sources 311 is not limited thereto, and the plurality of light sources 311 may be arranged in various patterns to obtain uniform luminance of the emitted light 311.

The light source 311 may include a device capable of emitting monochromatic light (light of one color, for example, blue light) or white light (combination of various wavelengths) in various directions upon supply of power.

The support 312 may fix the plurality of light sources 311 to prevent dislocation of the light sources 311. In addition, the support 312 may supply power to each of the light sources 311 to emit light.

A plurality of supports 312 may be provided in accordance with the arrangement of the plurality of light sources 311. For example, when the plurality of light sources 311 are aligned in rows as illustrated in FIG. 17, the number of supports 312 may be the same as the number of rows of the plurality of light sources 311, and each of the supports 312 may fix the light sources 311 belonging to each row. The support 312 may be formed of a synthetic resin provided with conductive power supply lines or a printed circuit board (PCB) to fix the plurality of light sources 311 and supply power to the light sources 311.

The reflection sheet 320 may be disposed in front of the light emitting module 310 to reflect light emitted backward to proceed forward.

The reflection sheet 320 has a plurality of through-holes 320a at positions corresponding to the plurality of light sources 311. The light sources 311 may penetrate the through-holes 320a and protrude forward from the reflection sheet 320 as illustrated in FIG. 18.

The reflection sheet 320 may be manufactured by coating a highly reflective material on a base material. For example, the reflection sheet 230 may be manufactured by coating a polymer having a high reflectivity on a base material of polyethylene terephthalate (PET), or the like.

The diffuser plate 330 may be disposed in front of the light emitting module 310 and the reflection sheet 320 and light emitted from the light sources 311 may be uniformly diffused thereby.

Although the light sources 311 are arranged at equal intervals, luminance may become non-uniform depending on positions of the light sources 311. The diffuser plate 330 may diffuse light emitted from the light sources 311 within the diffuser plate 330 to remove non-uniformity of luminance of the light sources 311. In other words, the diffuser plate 330 may receive non-uniform light from the light sources 311 and emit uniform light forward.

The diffuser plate 330 may include poly methyl methacrylate (PMMA), transparent polycarbonate (PC), or the like including a diffusing agent to diffuse light.

The optical sheet 340 may include various sheets to improve luminance and uniformity of luminance. For example, the optical sheet 340 may include a diffuser film 341, a first prism film 342, a second prism film 343, and a reflective polarizing film 344.

A selective light absorption sheet 350 may be disposed between a plurality of films 341, 342, 343, and 344 included in the optical sheet 340, in front of the optical sheet 340, or behind the optical sheet 340.

The selective light absorption sheet 350 may selectively absorb light of a predetermined wavelength range. For example, the selective light absorption sheet 350 may include a selective light absorption material capable of selectively absorbing yellow light or orange light having a wavelength in the range of about 570 nm to about 610 nm. Thus, color reproduction of the display apparatus 100 may be enhanced.

The selective light absorption sheet 350 may include a selective light absorption film 351, light blocking films 352 and 353, and barrier films 354 and 355 as illustrated in FIG. 19.

The selective light absorption film 351 may selectively absorb yellow light or orange light. For example, the selective light absorption film 351 may include a selective light absorption material 351a capable of absorbing light having a wavelength in the range of about 570 nm to about 610 nm. The selective light absorption material 251a may be TAP well known in the art as porphyrazine.

The light blocking films 352 and 353 may block UV light and/or IR light and may include an UV-cut material (UV-CUT) and/or an IR-cut material (IR-CUT). The UV-cut material (UV-CUT) may absorb or reflect UV light, and the IR-cut material (IR-CUT) may absorb or reflect IR light.

The light blocking films 352 and 353 may be attached to external surfaces 351b and 351c of the selective light absorption film 351. Thus, the light blocking films 352 and 353 may prevent the selective light absorption film 351 from absorbing UV light and/or IR light.

The barrier films 354 and 355 may block impurities such as moisture and/or oxygen. The barrier films 354 and 355 may be attached to external surfaces of the light blocking films 352 and 353. As a result, the barrier films 354 and 355 may prevent the selective light absorption film 351 from being exposed to moisture and/or oxygen.

The structure of the selective light absorption sheet 350 is not limited to that illustrated in FIG. 19. For example, the selective light absorption sheet 350 may have various structures as described above with reference to FIGS. 10, 11, 12, 13, 14, 15, and 16.

As described above, exposure of the selective light absorption film 351 to UV light, IR light, moisture and/or oxygen, and the like may be prevented by the light blocking films 352 and 353 and the barrier films 354 and 355, and lifespan of the selective light absorption film 351 may be prolonged.

As is apparent from the above description, according to an embodiment of the present disclosure, the display apparatus may have enhanced color reproduction.

According to another embodiment of the present disclosure, a back light unit including a selective light absorption film that absorbs yellow light and/or orange light and a display apparatus including the same are provided.

According to another embodiment of the present disclosure, a display apparatus may prevent deterioration of the selective light absorption film.

According to another embodiment of the present disclosure, a back light unit including a selective light absorption film which is not exposed to moisture, oxygen, UV light, and/or IR light and a display apparatus including the same are provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A display apparatus, comprising:
a back light unit including a light source and a selective light absorption sheet configured to absorb light of a predetermined wavelength range among the light emitted from the light source; and
an image forming unit configured to transmit or block the light emitted from the back light unit to form an image,
wherein the selective light absorption sheet comprises:
a selective light absorption film configured to absorb the light of the predetermined wavelength range among the light emitted from the light source;
at least one light blocking film configured to absorb at least one of UV light and IR light; and
at least one barrier film configured to block at least one of oxygen and moisture;
wherein the at least one light blocking film comprises a first light blocking film and a second light blocking film, and the at least one barrier film comprises a first barrier film and a second barrier film.

2. The display apparatus according to claim 1, wherein the first and second light blocking films are attached to first and second surfaces of the selective light absorption film, respectively, and the first and second barrier films are attached to the first and second light blocking films, respectively.

3. The display apparatus according to claim 1, wherein the first and second barrier films are attached to first and second surfaces of the selective light absorption film, respectively, and the first and second light blocking films are attached to the first and second barrier films, respectively.

4. The display apparatus according to claim 1, wherein the back light unit further comprises a waveguide plate configured to diffuse the light emitted from the light source, the light source is disposed at a side of the waveguide plate, and the selective light absorption sheet is disposed between the light source and the waveguide plate.

5. The display apparatus according to claim 1, wherein the back light unit further comprises a diffuser plate configured to diffuse the light emitted from the light source, the light source is disposed behind the diffuser plate, and the selective light absorption sheet is disposed in front of the diffuser plate.

6. The display apparatus according to claim 1, wherein the selective light absorption film comprises tetra-aza-porphyrin (TAP) absorbing the light having a wavelength in the range of about 570 nm to about 610 nm.

7. A back light unit, comprising:
a light source; and
a selective light absorption sheet configured to absorb light of a predetermined wavelength range among the light emitted from the light source,
wherein the selective light absorption sheet comprises:
a selective light absorption film configured to absorb the light of the predetermined wavelength range among the light emitted from the light source;
at least one barrier film configured to block at least one of oxygen and moisture; and
at least one light blocking film configured to absorb at least one of UV light and IR light;
wherein the at least one light blocking film comprises a first light blocking film and a second light blocking film, and the at least one barrier film comprises a first barrier film and a second barrier film.

8. The back light unit according to claim 7, wherein the first and second light blocking films are attached to first and second surfaces of the selective light absorption film, respectively, and the first and second barrier films are attached to the first and second light blocking films, respectively.

9. The back light unit according to claim 7, wherein the first and second barrier films are attached to first and second surfaces of the selective light absorption film, respectively, and the first and second light blocking films are attached to the first and second barrier films, respectively.

* * * * *